United States Patent
Zhao et al.

(10) Patent No.: US 9,470,804 B2
(45) Date of Patent: Oct. 18, 2016

(54) BORON COATED NEUTRON DETECTOR AND METHOD FOR MANUFACTURING THE SAME

(75) Inventors: Ziran Zhao, Beijing (CN); Yongqiang Wang, Beijing (CN); Zhiqiang Chen, Beijing (CN); Qingjun Zhang, Beijing (CN); Yuanjing Li, Beijing (CN); Yinong Liu, Beijing (CN); Shaoji Mao, Beijing (CN); Nan Yao, Beijing (CN); Shuqiang Dong, Beijing (CN)

(73) Assignees: Tsinghua University, Beijing (CN); Nuctech Company Limited, Beijing (CN)

(*) Notice: Subject to any disclaimer, the term of this patent is extended or adjusted under 35 U.S.C. 154(b) by 214 days.

(21) Appl. No.: 14/112,692

(22) PCT Filed: Apr. 13, 2012

(86) PCT No.: PCT/CN2012/000512
§ 371 (c)(1),
(2), (4) Date: Nov. 18, 2013

(87) PCT Pub. No.: WO2012/142859
PCT Pub. Date: Oct. 26, 2012

(65) Prior Publication Data
US 2014/0061490 A1    Mar. 6, 2014

(30) Foreign Application Priority Data
Apr. 18, 2011   (CN) .......................... 2011 1 0096455

(51) Int. Cl.
*G01T 3/00* (2006.01)

(52) U.S. Cl.
CPC ................. *G01T 3/00* (2013.01); *G01T 3/008* (2013.01); *Y10T 29/49117* (2015.01)

(58) Field of Classification Search
CPC .................................. G01T 3/00; G01T 3/008
USPC .................... 250/390.01, 370.05, 391, 385.1
See application file for complete search history.

(56) References Cited

U.S. PATENT DOCUMENTS

| 2,499,311 A | * | 2/1950 | Herzog | .................. | H01J 47/12 |
| | | | | | 250/390.01 |
| 2,512,769 A | * | 6/1950 | Crumrine | ................ | H01J 47/12 |
| | | | | | 250/390.01 |

(Continued)

FOREIGN PATENT DOCUMENTS

| CN | 1125351 A | 6/1996 |
| CN | 1254096 A | 5/2000 |

(Continued)

OTHER PUBLICATIONS

Lacy et al., "Novel neutron detector for high rate imaging applications", 2002, Nuclear Science Symposium Conference Record, 2002 IEEE, vol. 1, pp. 392-396.*

(Continued)

*Primary Examiner* — David Porta
*Assistant Examiner* — Blake Riddick
(74) *Attorney, Agent, or Firm* — Withrow & Terranova, P.L.L.C.

(57) ABSTRACT

A boron-coated neutron detector, comprising a cathode tube with a plurality of passages formed therein along its longitudinal direction, the inner wall of each passage being coated with boron material; an electrode wire serving as an anode and arranged longitudinally in each of the passages, the electrode wire adapted to be applied with high voltage; and an insulating end plate to which each end of the cathode tube is fixed, the electrode wire being fixed to the cathode tube via the insulating end plate. Preferably, the cathode tube is formed by jointing a plurality of boron-coated substrates. The boron-coated neutron detector increases the detection efficiency of the neutron detector, which may reach or even exceed the detection efficiency of the $^3$He neutron detector of the same size, and the cost thereof is much cheaper than the $^3$He neutron detector.

16 Claims, 2 Drawing Sheets

(56) References Cited

U.S. PATENT DOCUMENTS

| | | | | |
|---|---|---|---|---|
| 2,534,922 | A | * | 12/1950 | Marshall .................. H01J 47/12 250/372 |
| 4,437,034 | A | * | 3/1984 | Lewandowski ....... H01J 47/001 140/71 B |
| 4,454,850 | A | * | 6/1984 | Horvath .................. F02B 43/10 123/1 A |
| 4,785,168 | A | * | 11/1988 | Ruscev et al. ............ 250/390.12 |
| 5,430,777 | A | * | 7/1995 | Burel .................. H01J 47/1227 376/154 |
| 7,791,037 | B1 | * | 9/2010 | Wedding et al. ............. 250/374 |
| 2005/0258373 | A1 | * | 11/2005 | Lacy ....................... G01T 1/185 250/390.01 |
| 2007/0025505 | A1 | * | 2/2007 | Bjorkholm ..................... 378/53 |
| 2010/0258734 | A1 | * | 10/2010 | McCormick et al. ... 250/390.01 |
| 2010/0258735 | A1 | * | 10/2010 | Weissman et al. ....... 250/390.01 |
| 2010/0258736 | A1 | * | 10/2010 | McCormick et al. ... 250/390.01 |
| 2010/0301226 | A1 | * | 12/2010 | Lacy ............................ 250/391 |
| 2012/0032090 | A1 | * | 2/2012 | Lustig ..................... G01T 1/185 250/390.01 |
| 2012/0217406 | A1 | * | 8/2012 | McGregor ............. G01T 3/008 250/361 R |
| 2012/0223242 | A1 | * | 9/2012 | Brown .................... G01T 3/008 250/391 |
| 2013/0168565 | A1 | * | 7/2013 | Yang et al. ................ 250/390.1 |
| 2013/0341519 | A1 | * | 12/2013 | Li et al. ........................ 250/368 |

FOREIGN PATENT DOCUMENTS

| | | |
|---|---|---|
| CN | 202221480 U | 5/2012 |
| DE | 2115265 A1 | 10/1972 |
| JP | S60172155 A | 9/1985 |
| WO | 2011025853 A1 | 3/2011 |

OTHER PUBLICATIONS

International Search Report for PCT/CN2012/000512, mailed Jul. 26, 2012, 2 pages.
Chinese Office Action for Chinese Patent Application No. 201110096455.4, mailed Nov. 6, 2013, 8 pages.
Third Office Action for Chinese Patent Application No. 201110096455.4, mailed Feb. 13, 2015, 4 pages.
Lacy, J.L. et al., "Novel neutron detector for high rate imaging applications," IEEE Nuclear Science Symposium Conference Record, vol. 1, Nov. 10-16, 2002, IEEE, pp. 392-396.
Second Office Action for Chinese Patent Application No. 201110096455.4, mailed Jun. 10, 2014, 7 pages.
Extended European Search Report for Patent Application No. 12774501.6, mailed Aug. 6, 2014, 11 pages.

* cited by examiner

BORON COATED NEUTRON DETECTOR AND METHOD FOR MANUFACTURING THE SAME

This application is a 35 USC 371 national phase filing of International Application PCT/CN2012/000512, filed Apr. 13, 2012, which claims priority to Chinese national application 201110096455.4 filed Apr. 18, 2011, the disclosures of which are incorporated herein by reference in their entireties.

TECHNICAL FIELD

The present invention relates to the field of neutron detectors, and more particularly to a boron-coated neutron detector and a method for manufacturing the same.

BACKGROUND ART

It is well-known that a neutron detector is a detector that is capable of detecting neutrons. Neutrons do not have charges, which results in no ionization or excitation, so typical detectors cannot detect neutrons directly. The neutron detector conducts measurement by utilizing secondary particles generated in the reaction (including nuclear reaction, nuclear fission or nuclear recoil) between neutrons and some atomic nuclei contained in the detector.

The most common neutron detector in the prior art is a $^3$He neutron detector, such as, a $^3$He proportional counter tube neutron detector. The detection principle of the $^3$He neutron detector is based on nuclear reaction, the process of which is shown as follows:

$$^3\text{He} + n \rightarrow {}^1\text{H} + {}^3 + 765 \text{ KeV} \qquad (1)$$

The reaction product is charged particles of protons and tritons. Reaction energy generated in the reaction caused by thermal neutrons is distributed between protons and tritons. Protons and tritons work within a proportional counter tube which uses $^3$He gas as working gas. When protons and tritons pass through the gas, they undergo ionization collision with $^3$He gas so that the molecules of the $^3$He gas are ionized and loss some energy to form a large number of ion pairs (electrons and positive ions). The $^3$He neutron detector, as a gas detector, is applied a high positive voltage on its central anode wire, and an electrical field is therefore formed between the anode wire and the tube wall of an outer shell. Under the action of an external electrical field, the electrons and positive ions drift towards positive and negative electrodes, respectively, wherein electrons drift towards the anode wire, and wherein the positive ions drift towards a cathode wall and are collected by the electrodes.

The $^3$He neutron detector usually has a co-axial cylindrical structure, wherein the anode wire is located on the longitudinal central axis of the cylindrical tube wall serving as a cathode.

The $^3$He neutron detector has the stable and ripe performance, and is widely applicable and popular in the fields of scientific researches, anti-terrorism and safety inspection. However, the global annual output of $^3$He gas is not increased, which causes the supply of $^3$He gas extremely scarce. Therefore, the key search and development in the art is to find a cost-effective product that can replace the $^3$He neutron detector.

It is thus desirable to replace the $^3$He neutron detector with the proportional counter tube neutron detector coated with boron on the inner tube wall. Such a boron-coated neutron detector is much cheaper than the $^3$He neutron detector. However, the boron-coated neutron detector has the neutron counting rate which is only about one tenth of that of the $^3$He neutron detector of the same size, and therefore has the poor detection efficiency.

Such a boron-coated neutron detector can be further improved to obtain a highly effective, relatively cheap neutron detector.

SUMMARY OF THE INVENTION

The first object of the present invention is to provide a boron-coated neutron detector, comprising a cathode tube with a plurality of passages along the longitudinal direction formed therein, the inner wall of each passage being coated with boron material; an electrode wire serving as an anode and arranged longitudinally in each of the passages, the electrode wire adapted to be applied with high voltage; and an insulating end plate fixed to which each end of the cathode tube is fixed, the electrode wire being fixed to the cathode tube via the insulating end plate.

By providing a plurality of passages in the cathode tube coated with boron material on the inner walls thereof, the boron-coated neutron detector has the improved detection efficiency of the neutron detector, which can reach or even exceed the detection efficiency of the $^3$He neutron detector of the same size, but the cost thereof is much cheaper than the $^3$He neutron detector.

As a preferred embodiment, the cathode tube is formed by jointing a plurality of boron-coated substrates to thereby form the plurality of passages therein. Furthermore, each of the substrates is substantially L-shaped which is formed by folding a planar substrate, in such a way to provide each passage with a square cross section, or each of the substrates contains at least one L-shaped step formed by folding a planar substrate, in such a way to provide each passage with a square cross section.

The cathode tube is formed by jointing boron-coated substrates, which simplifies production and installation/adjustment process of the neutron detector of the present invention and effectively reduces debris of a boron material and interference caused thereby.

The substrates may be coated with the boron material before being folded. Alternatively, the substrates are coated with the boron material after being folded, which can further reduce debris of the boron material and interference caused thereby.

Furthermore, the cathode tube may have a circular or square cross section along its longitudinal direction, which is dependent on the actual demands.

The plurality of passages forms an array in the range from 2×2 to M×N, wherein M and N are both an integer larger than 2.

As another preferred embodiment of the boron-coated neutron detector of the present invention, the cathode tube is provided therein with partition plates coated with a boron material to thereby form the plurality of passages, and the cathode tube has a circular or square cross section along its longitudinal direction. Furthermore, the cathode tube and the partition plates are made of the same material.

The passage has a length ranging from 50 mm to 3000 mm, and the length and width of the cross section taken perpendicular to the length of the passage is in the range from 2 mm to 15 mm.

The method for coating the boron material is selected from the group consisting of electrophoresis, physical vapor deposition and plasma spraying. The physical vapor deposition comprises E-beam evaporation, magnetic spattering and pulse laser deposition and so on.

In addition, each of the insulating end plates is provided with an individual electrode wire fastening device for fastening the electrode wire. The electrode wire fastening device is a wire-clamped pipe corresponding to each of the passages, which is embedded in the insulating end plate to allow the electrode wire in the passage to extend therethrough and to fasten the electrode wire.

Preferably, on a side of the insulating end plate facing the passage is there a position limiting hole corresponding to each of the passages, for instance, a funnel-like position limiting hole, to facilitate entry of the electrode wire into the wire-clamped pipe through the hole.

The neutron detector further comprises an outer shell including a tube body, a chassis and a ceramic sealing disc which together form an air-tight chamber, wherein the cathode tube is located within the air-tight chamber, the ceramic sealing disc is provided with a central electrode thereon, and the central electrode and the electrode wire in each of the passages form an electrical connection. The ceramic sealing disc is also provided with a gas charging and discharging tube for evacuation and gas charging operation.

The second object of the present invention is to provide a boron-coated neutron detector, comprising a passage array serving as a cathode and formed by jointing a plurality of boron-coated substrates such that the inner wall of each passage is coated with a boron material; an electrode wire serving as an anode and arranged longitudinally in each of the passages, the electrode wire adapted to be applied with high voltage; and an insulating end plate to which each end of the cathode tube is fixed, the electrode wire being fixed to the passage array via the insulating end plate.

The boron-coated neutron detector has the passage array formed by jointing the plurality of boron-coated substrates, wherein the inner wall of each passage is coated with the boron material. The neutron detector is not only simple in manufacturing process, but also greatly increases the detection level of the boron-coated neutron detector.

The third object of the present invention is to provide a method for manufacturing a boron-coated neutron detector, comprising the steps of providing a cathode tube with a plurality of passages along the longitudinal direction formed therein, the inner wall of each passage being coated with boron material; providing an electrode wire serving as an anode and adapted to be applied with high voltage; arranging the electrode wire longitudinally in each of the passages; providing an insulating end plate; fixing the insulating end plate to each end of the cathode tube, and fixing both ends of the electrode wire within each of the passages to the insulating end plates.

Furthermore, the method further comprises the step of providing a plurality of boron-coated substrates to form the cathode tube by the way of jointing.

The step of providing a plurality of boron-coated substrates comprises: providing a plurality of rectangular substrates; plating the substrates with the boron material; folding the substrate into L shape along the medial line of the plated substrate; combining the L-shaped substrates to produce the cathode tube in such a way that each of the passages has a square cross section.

Alternatively, the step of providing a plurality of boron-coated substrates comprises: providing a plurality of rectangular substrates; folding the substrate into L shape along the medial line of the substrate; plating the L-shaped substrates with the boron material; combining the L-shaped plated substrates to produce the cathode tube in such a way that each of the passages has a square cross section.

Alternatively, the step of providing a plurality of boron-coated substrates comprises: providing a plurality of rectangular substrates; plating the substrates with the boron material; folding the substrate into the one comprising at least one L-shaped step along the medial line of the plated substrate; combining the substrates comprising the at least one L-shaped step to produce the cathode tube in such a way that each of the passages has a square cross section.

Alternatively, the step of providing a plurality of boron-coated substrates comprises: providing a plurality of rectangular substrates; folding the substrate into the one comprising at least one L-shaped step along the medial line of the substrate; plating the substrates comprising the at least one L-shaped step with the boron material; combining the plated substrates comprising the at least one L-shaped step to produce the cathode tube in such a way that each of the passages has a square cross section.

Furthermore, the step of fixing both ends of the electrode wire within each of the passages to the insulating end plates comprises: fixing one end of the electrode wire to the insulating end plate; tensioning the electrode wire, and fixing the other end of the tensioned electrode wire to another insulating end plate.

Furthermore, the outer shell is also provided, including a tube body, a chassis and a ceramic sealing disc which together form an air-tight chamber, wherein the cathode tube is located within the air-tight chamber, the ceramic sealing disc is provided with a central electrode thereon, and the central electrode and the electrode wire in each of the passages form an electrical connection.

The fourth object of the present invention is to provide a method for manufacturing a boron-coated neutron detector, comprising the steps of providing a passage array formed by jointing a plurality of boron-coated substrates in such a way that the inner wall of each passage is coated with boron material; providing an electrode wire serving as an anode and adapted to be applied with high voltage; arranging the electrode wire longitudinally in each of the passages; providing an insulating end plate; fixing the insulating end plate to each end of the passage array, and fixing both ends of the electrode wire within each of the passages to the insulating end plate, respectively.

The step of forming a plurality of boron-coated substrates comprises: providing a plurality of rectangular substrates; plating the substrates with the boron material; folding the substrate into L shape along the medial line of the plated substrate; combining the L-shaped substrates to produce the passage array in such a way that each of the passages has a square cross section.

Alternatively, the step of forming a plurality of boron-coated substrates comprises: providing a plurality of rectangular substrates; folding the substrate into L shape along the medial line of the substrate; plating the L-shaped substrates with the boron material; combining the L-shaped plated substrates to produce the passage array in such a way that each of the passages has a square cross section.

Alternatively, the step of forming a plurality of boron-coated substrates comprises: providing a plurality of rectangular substrates; plating the substrates with the boron material; folding the substrate into the one comprising at least one L-shaped step along the medial line of the plated substrate; combining the substrates comprising the at least one L-shaped step to produce the passage array in such a way that each of the passages has a square cross section.

Alternatively, the step of forming a plurality of boron-coated substrates comprises: providing a plurality of rectangular substrates; folding the substrate into the one comprising at least one L-shaped step along the medial line of the substrate; plating the substrates comprising the at least one L-shaped step with the boron material; combining the plated substrates comprising the at least one L-shaped step to produce the passage array in such a way that each of the passages has a square cross section.

Furthermore, the step of respectively fixing both ends of the electrode wire within each of the passages to the insulating end plates comprises: fixing one end of the electrode wire to the insulating end plate; tensioning the electrode wire, and fixing the other end of the tensioned electrode wire to another insulating end plate.

Furthermore, the outer shell is also provided, including a tube body, a chassis and a ceramic sealing disc which together form an air-tight chamber, wherein the passage array is located within the air-tight chamber, the ceramic sealing disc is provided with a central electrode thereon, and the central electrode and the electrode wire in each of the passages form an electrical connection.

Other objects and advantages of the present invention would become obvious from the following detailed description with reference to drawings.

DETAILED DESCRIPTION OF THE PREFERRED EMBODIMENTS

Figure 1:
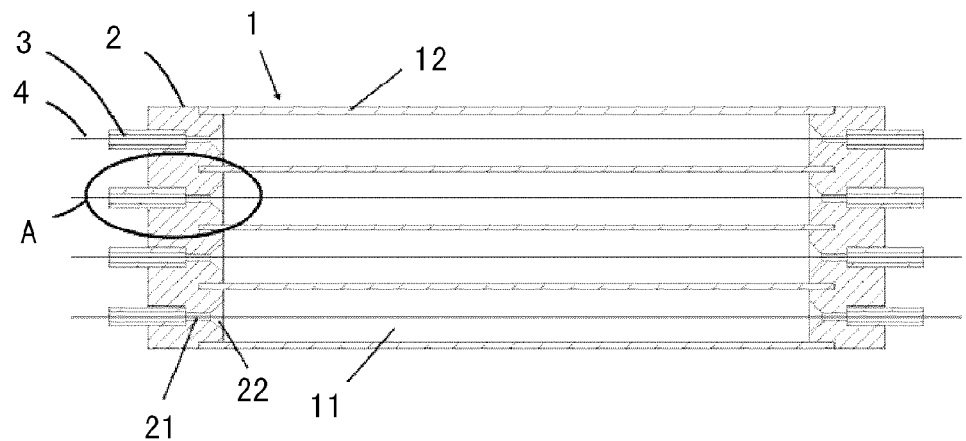
FIG. 1 is an axial cross-sectional view of one embodiment of a boron-coated neutron detector according to the present invention.

FIG. 1 shows one embodiment of a boron-coated neutron detector according to the present invention. With reference to FIG. 1, the main body of the boron-coated neutron detector of the present invention comprises a tube 1 serving as a cathode, an electrode wire 4 adapted to be applied with high voltage and an insulating end plate 2, wherein the tube 1 includes a plurality of passages 11 formed longitudinally therein, and the inner wall of each of the passages 11 is plated with a film formed from a boron material. Each of the passages 11 is provided therein with the electrode wire 4 longitudinally, and preferably the electrode wire 4 is substantially co-axial with the passage. The insulating end plates 2 are fixed to both ends of the tube 1 respectively. Each insulating end plate 2 is provided with a channel 21 which allows passage of each electrode wire 4. Both ends of the electrode wire 4 respectively extend through the channel 21 and are fixed to the insulating end plates 2.

Figure 3:
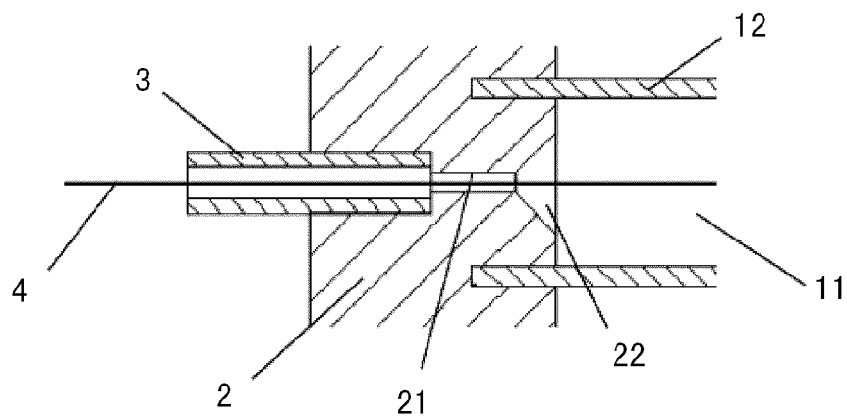
FIG. 3 is a partially enlarged view of the embodiment of FIG. 1.

As shown in FIG. 3, the walls at both ends of the tube 1 are respectively embedded into the insulating end plates 2.

Figure 2:
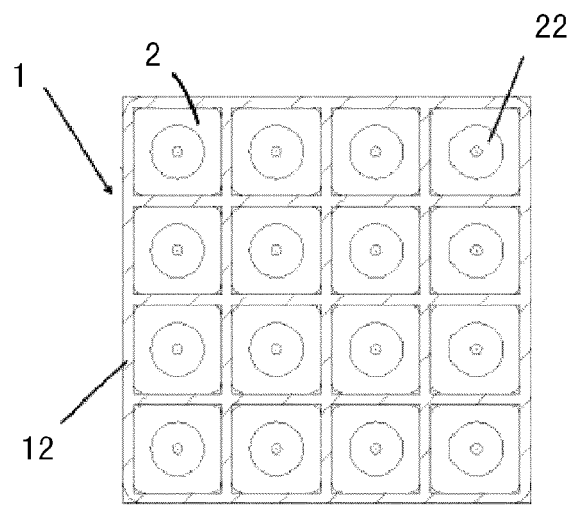
FIG. 2 is a radial cross-sectional view of the embodiment of FIG. 1.

As a preferred embodiment, the tube 1 and the passages 11 therein are formed by jointing substrates 12 coated with a boron material. As shown in FIG. 2, the substrates 12 coated with the boron material are jointed into a "井" shaped combination, which produces a 4×4 array of the passages 11, wherein all the passages 11 have the same square cross sections along the axial direction of the tube 1, and the entire tube 1 also has a square cross section along its longitudinal direction. However, the cross sections of the tube and the passages formed by jointing the substrates are not limited to square. They can be circular, prismatic, rectangular or triangular, which is dependent on the actual demands.

Figure 4:
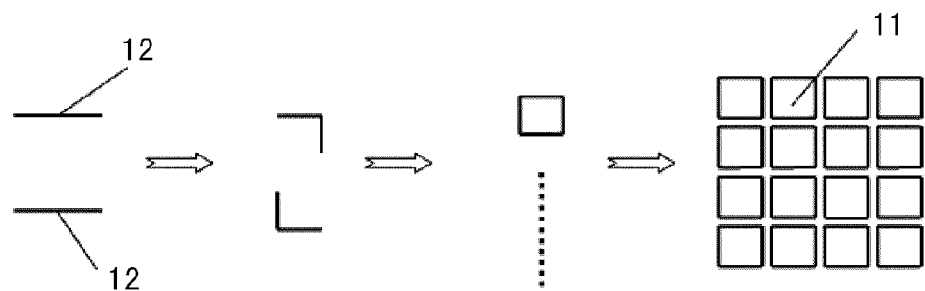
FIG. 4 is a view of the first embodiment of the method for manufacturing the boron-coated neutron detector according to the present invention.

As shown in FIG. 4, the substrates 12 coated with the boron material are rectangular, and are folded into an "L" shape along the medial line. Two "L"-shaped substrates 12 are coupled to a square tube along their long edges by argon arc welding, tin welding or adhesion, and the plurality of square tubes 4 are arranged into a passage array as shown in FIG. 4. Certainly, the boron material can be coated onto the substrates after the substrates 12 are folded into the "L" shape.

Figure 5:
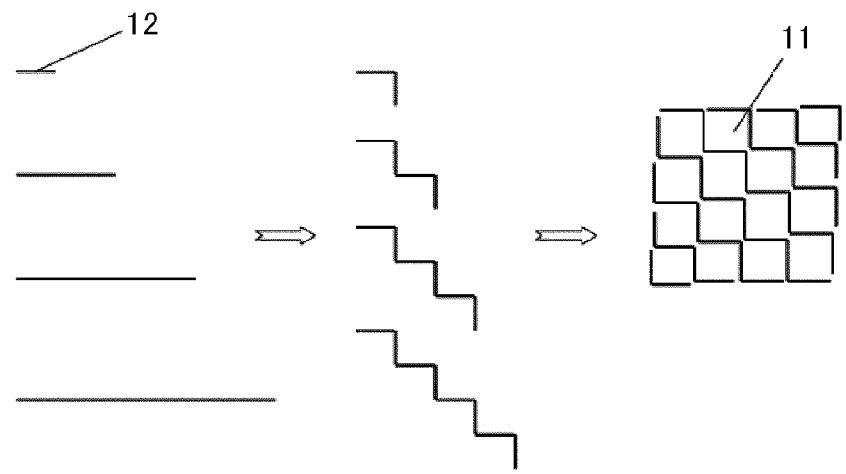
FIG. 5 is a view of the second embodiment of the method for manufacturing the boron-coated neutron detector according to the present invention.

Alternatively, as shown in FIG. 5, the substrate 12 coated with the boron material is folded into a shape containing at least one "L"-shaped step, and then the plurality of such substrates are combined to form a passage array as shown in FIG. 5. Similarly, the boron material can be coated after the substrates 12 are folded.

Of course, in other embodiments, the substrates may be folded into other shapes so as to be combined to form the cross-sectional shapes of the passages, such as circular, prismatic or triangular and so on.

In this embodiment, the passage has a length of 200 mm, and the area of the cross section of each passage taken perpendicular to the length of the passage is 4.5 mm×4.5 mm. Of course, in other embodiments, the length and width of the cross section of each passage is preferably selected in the range from 2 mm to 15 mm, and the length of the passage is selected in the range from 50 mm to 3000 mm.

Furthermore, several supporting plates may be added to the middle portion of the passage so as to increase the strength of the wall of the passage.

In this embodiment, the substrate is made of a 0.3 mm thick aluminum plate. In other embodiments, the substrate may also be made of aluminum, beryllium, plastic or the like which are suitable as a cathode, and has a thickness selected in the range from 0.01 mm to 1 mm.

The substrate is coated with $B_4C$ material having a thickness about 1 μm, wherein boron-10 accounts for about 90% of the total boron content. Preferably, the coating thickness of the boron material can be selected in the range from 0.1 μm to 4 μm. In other embodiments, boron-10 may account for about 19% to 99.9% of the total boron content.

The boron material is plated onto the substrate by means of E-beam evaporation. In other embodiments, other coating methods may be utilized, such as physical vapor deposition (PVD) (for example, including electrophoresis, magnetic spattering and pulse laser deposition or the like), and plasma spraying, and so on.

Preferably, as shown in FIG. 3, wire-clamped pipes 3 are embedded into the insulating end plates 2. The number of the wire-clamped pipes 3 is the same as those of the passages 11, and the wire-clamped pipes are in communication with the passages of the insulating end plates 2. The wire-clamped pipes 3 project on the side of the insulating end plates 2 facing away from the passages 11, such that the electrode wire 4 extending through the wire-clamped pipes can be fixed to the insulating end plates 2 by clamping the projection of the wire-clamped pipe into a flat shape. Of course, the electrode wire can also be fixed to the insulating end plates 2 by other means. The wire-clamped pipe is made of a Φ1.1 mm copper pipe with the inner wall thickness of 0.15 mm. In other embodiments, the wire-clamped pipe may also be a nickel pipe, or the like.

On a side of the insulating end plate 2 facing the passage 11 is there a position limiting hole, preferably a funnel-like position limiting hole, to facilitate passage of the electrode wire 4 through the channel in the insulating end plate 2. The position limiting hole is in communication with the channel 21 in the insulating end plate 2.

In the present embodiment, the insulating end plate is made of an entire glass fibre plate. Alternatively, in other embodiments, the insulating end plate may be divided into small pieces according to the size of the cross section of each of the passages and then combined by a frame. The insulating end plate may be made of an insulating material selected from the group consisting of ceramics, polytetrafluoroethene, polyimide and polyetheretherketone, or the like.

In the present embodiment, a high voltage electrode wire is a Φ30 μm gold-plated tungsten wire. In other embodiments, the diameter of the electrode wire can be selected in the range from 20 μm to 60 μm according to the different electric voltages, and the material thereof may be other metallic microfilament made of, for example, a nickel-chromium alloy and so on.

The high voltage electrode wire 4 extends though each of the passages 11, through the funnel-like position limiting hole 22 and the channel 21 of the insulating end plate 2, and enters into the wire-clamped pipe 3 at both ends thereof. After applying a certain tensioning force to the electrode wire 4 by a tool, the wire-clamped pipe 4 at both ends of the insulating end plate is flattened by a clamp to fix the electrode wire.

Figure 6:
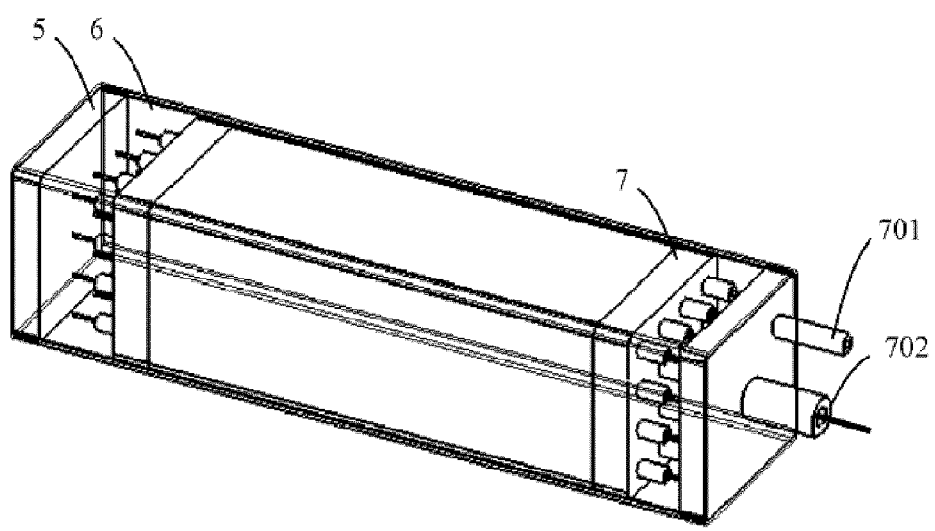
FIG. 6 is a perspective view of another embodiment of the boron-coated neutron detector according to the present invention.

Furthermore, as shown in FIG. 6, another embodiment of the boron-coated neutron detector of the present invention is provided. The neutron detector further comprises an outer shell made of a stainless steel outer tube 6 with a square cross section, a chassis 5 of the outer tube and a ceramic sealing disc 7 of the outer tube to form an air-tight chamber, in which the main body of the detector (namely, the tube 1, the electrode wire 4 and the insulating end plate 2) is located. The boron-coated substrate combination 1 as a grounding electrode is connected with the stainless steel outer tube 6.

All the high voltage electrode wires 4 are connected together for introduction of high voltage and output of signals, and form an electrical connection with an external central electrode 702 of the ceramic sealing disc 7 of the outer tube at the top so that the wires are led out.

The ceramic sealing disc 7 of the outer tube at the top is provided with a gas charging and discharging tube 701 adjacent to the edge thereof for evacuation and gas charging operation.

Of course, if the high voltage electrode wires (which are nickel-chromium alloy wires or the like with a certain resistance) on the insulating end plates at the both sides are respectively led out, it will form a position-sensitive neutron detector array.

In other embodiments, the shape of the outer shell is not limited to the square cross section. For example, the outer shell may consist of an outer tube with the circular cross section, a chassis of the outer tube and a sealing disc of the outer tube.

As another embodiment of the boron-coated neutron detector of the present invention (not shown), the cathode tube is a conventional cylindrical tube coated with the boron material on its inner wall. The cathode tube is added therein with boron-coated partition plates along its longitudinal direction so as to form a plurality of longitudinal passages therein, through each of which the electrode wire can pass. Reference may be made to the abovementioned embodiments for the non-described details of the present embodiment.

One embodiment of a method for manufacturing a boron-coated neutron detector of the present invention will be described in details as follows:

providing a plurality of rectangular substrates;

plating the substrates with the boron material;

folding the substrate into L shape along the medial line of the plated substrate (as shown in FIG. 4);

sequentially inserting the L-shaped substrates into the respective grooves of the insulating end plate to form an passage array serving as a grounding electrode, the inner wall of each passage being coated with the boron material;

providing an electrode wire serving as an anode and adapted to be applied with high voltage;

arranging the electrode wires longitudinally in each of the passages;

allowing the electrode wires to extend through a funnel-like position limiting hole in the insulating end plate and to enter into wire-clamped pipes embedded in the insulating end plates at both ends of the electrode wires;

flattening the wire-clamped pipes at one end by a clamp so as to fix one end of the electrode wires;

applying a tensioning force to the electrode wires by hanging a heavy weight (e.g., about 60 g) at the other end; and flattening the other end of the wire-clamped pipe to fix the other end of the electrode wire.

Furthermore, an outer shell is provided, which includes a tube, a chassis and a ceramic sealing disc that form an air-tight chamber, the passage array is disposed within the air-tight chamber, and the ceramic sealing disc is provided with a central electrode and a gas charging and discharging tube thereon, and all the electrode wires are connected together to be led out through the central electrode for introduction of high voltage and output of signals.

Alternatively, in another embodiment, the substrate is folded along the medial line of the plated substrate into a substrate containing at least one L-shaped step (as shown in FIG. 5).

In yet another embodiment, the substrate is coated with the boron material after being folded.

Although the typical embodiments of the present invention have been described, it shall be apprehended that the present invention is not limited to these embodiments. Any modifications and improvements of the present invention can be realized for those skilled in the art. For example, elements and corresponding technical specifications in one embodiment can be used in another embodiment, and these are all within the spirit and scope of the claims of the present invention.

The invention claimed is:

1. A boron-coated neutron detector, comprising:
   a cathode tube with a plurality of passages formed therein along its longitudinal direction, the inner wall of each passage being coated with boron material;
   an electrode wire serving as an anode and arranged longitudinally in each of the passages; and an insulating end plate fixed to each end of the cathode tube, the electrode wire being fixed to the cathode tube via the insulating end plates, wherein the cathode tube is formed of a plurality of boron-coated substrates that form the plurality of passages and each of the plurality of boron-coated substrates contains at least one L-shaped step, such that each of the plurality of passages has a square cross section and linear portions of adjacent ones of the plurality of boron-coated substrates do not overlap one another.

2. The boron-coated neutron detector according to claim 1, wherein an array of the passages are formed in the range from 2×2 to M×N, wherein M and N are both an integer larger than 2.

3. The boron-coated neutron detector according to claim 1, wherein the plurality of boron-coated substrates are coated with the boron material before being folded or after being folded.

4. The boron-coated neutron detector according to claim 1, wherein the plurality of boron-coated substrates has a thickness in the range from 0.01 mm to 1 mm.

5. The boron-coated neutron detector according to claim 1, wherein the coating thickness of the boron material is in the range from 0.1 μm to 4 μm.

6. The boron-coated neutron detector according to claim 1, wherein the boron material is selected from at least one of a boron material with natural components and a screened Boron-10 rich boron material with components by different percentages.

7. The boron-coated neutron detector according to claim 1, wherein the cathode tube is provided therein with partition plates coated with a boron material to thereby form the plurality of passages.

8. The boron-coated neutron detector according to claim 7, wherein the cathode tube has a circular or square cross section along its longitudinal direction.

9. The boron-coated neutron detector according to claim 1, wherein each of the insulating end plates is provided with an individual electrode wire fastening device therein for fastening the electrode wire.

10. The boron-coated neutron detector according to claim 9, wherein the electrode wire fastening device is a wire-clamped pipe corresponding to each of the passages, which is embedded in the insulating end plate to allow the electrode wire in the passage to extend therethrough and fasten the electrode wire, on a side of the insulating end plate facing the passage is there a position limiting hole corresponding to each of the passages to facilitate entry of the electrode wire into the wire-clamped pipe through the hole.

11. The boron-coated neutron detector according to claim 1, wherein the insulating end plate is made of a single plate or the insulating end plate is formed by combining unit plates corresponding to each of the passages.

12. The boron-coated neutron detector according to claim 1, wherein the neutron detector further comprises an outer shell including a tube body, a chassis and a ceramic sealing disc which form an air-tight chamber, wherein the cathode tube is located within the air-tight chamber, the ceramic sealing disc is provided with a central electrode thereon, and the central electrode and the electrode wire in each of the passages form an electric connection.

13. The boron-coated neutron detector according to claim 12, wherein the cross section of the outer shell along its length is circular or square.

14. The boron-coated neutron detector according to claim 1, wherein the cross section of the cathode tube along its longitudinal direction is circular or square.

15. A method for manufacturing a boron-coated neutron detector, comprising the steps of:
providing a plurality of boron-coated substrates to form a cathode tube with a plurality of passages formed therein along its longitudinal direction, the inner wall of each passage being coated with a boron material, wherein providing the plurality of boron-coated substrates to form the cathode tube with the plurality of passages comprises:
providing a plurality of rectangular substrates;
folding each of the plurality of rectangular substrates into a shape with at least one L-shaped step along a medial line of each of the plurality of rectangular substrates, wherein the plurality of rectangular substrates are plated with the boron material; and
combining the plurality of folded substrates to produce the cathode tube with a plurality of passages such that each of the passages has a square cross section, wherein linear portions of adjacent ones of the plurality of boron-coated substrates do not overlap one another; and
providing an electrode wire serving as an anode and adapted to be applied with high voltage;
arranging the electrode wire longitudinally in each of the passages;
providing an insulating end plate;
fixing the insulating end plate to each end of the cathode tube, and
fixing both ends of the electrode wire within each of the passages to the insulating end plate, respectively.

16. The method according to claim 15, wherein the step of fixing both ends of the electrode wire within each of the passages to the insulating end plates comprises:
fixing one end of the electrode wire to the insulating end plate;
tensioning the electrode wire; and
fixing the other end of the tensioned electrode wire to another insulating end plate.

* * * * *